(No Model.)
C. M. MAXSON.
SUCKER ROD AND TUBING ELEVATOR.
No. 425,183. Patented Apr. 8, 1890.
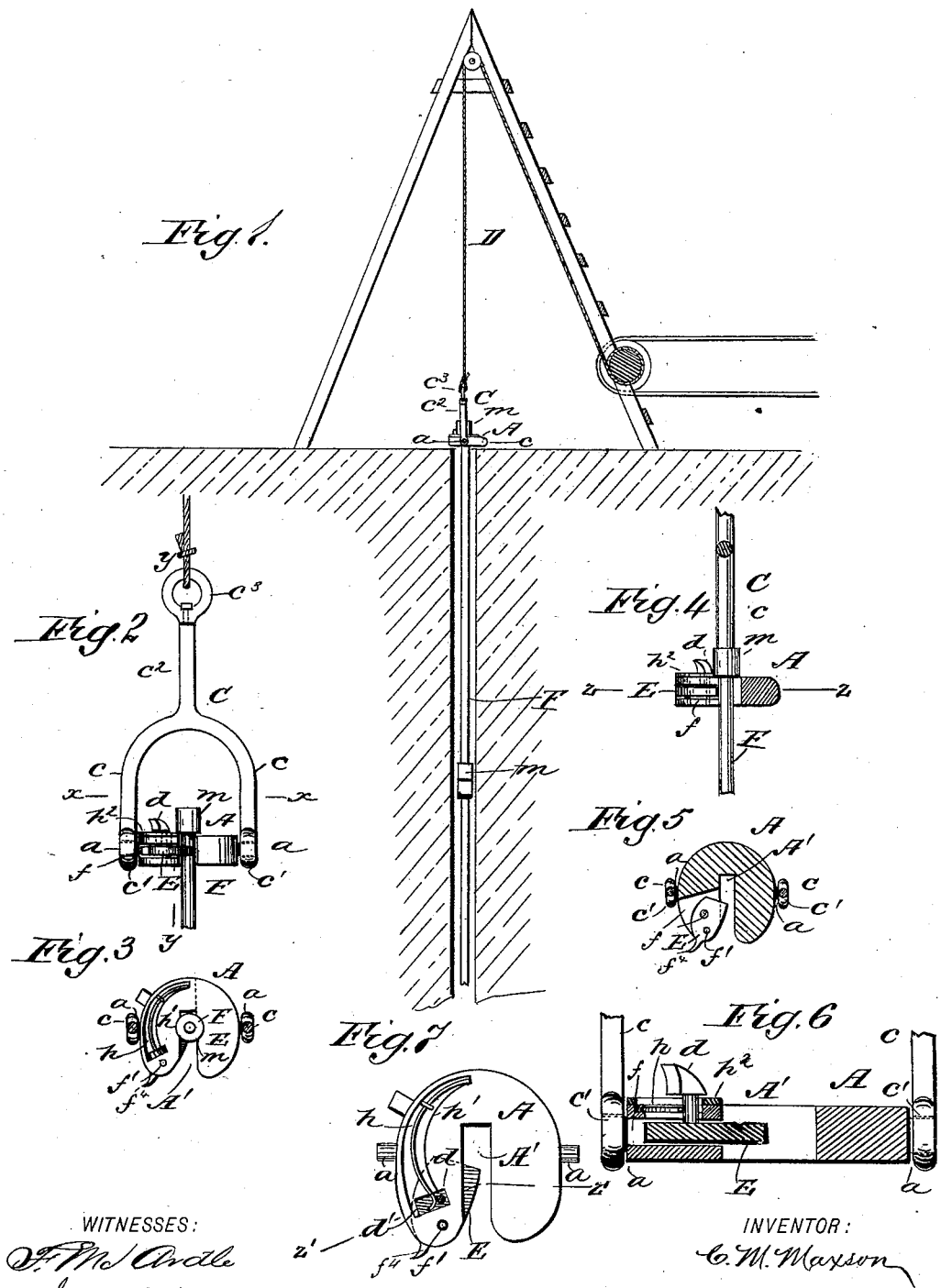
WITNESSES:
F. McArdle
C. Sedgwick
INVENTOR:
C. M. Maxson
BY
Munn & Co.
ATTORNEYS

UNITED STATES PATENT OFFICE.

CASSIUS M. MAXSON, OF ALLENTOWN, NEW YORK.

SUCKER-ROD AND TUBING ELEVATOR.

SPECIFICATION forming part of Letters Patent No. 425,183, dated April 8, 1890.

Application filed December 7, 1889. Serial No. 332,949. (No model.)

*To all whom it may concern:*

Be it known that I, CASSIUS M. MAXSON, of Allentown, in the county of Allegany and State of New York, have invented a new and Improved Sucker-Rod and Tubing Elevator, of which the following is a full, clear, and exact description.

The object of my invention is to provide an improved clamp or clutching device designed particularly for lifting pump or sucker rods from oil, salt, or other deep wells; and the invention consists of the special construction of the device, all as hereinafter described and claimed.

Reference is to be had to the accompanying drawings, forming part of this specification, in which similar letters of reference indicate corresponding parts in all the figures.

Figure 1 shows the method of using my invention, the same being illustrated as attached to the derrick-rope and applied to the pump or sucker rod. Fig. 2 is an enlarged front elevation of the lifting device, shown as applied to a pump or sucker rod. Fig. 3 is a sectional plan view of the same on line $xx$ of Fig. 2. Fig. 4 is a sectional view on line $yy$ of Fig. 2. Fig. 5 is a sectional plan view on the line $zz$ of Fig. 4. Fig. 6 is an enlarged sectional view on line $z'z'$ of Fig. 7; and Fig. 7 is an enlarged plan view of the clutch-block removed from the bail, the plate covering the spring being removed.

A represents the clutch-block formed with a slot A', and formed or provided with diametrical trunnions $a\ a$, which enter the eyes $c'\ c'$ of the bail C, thus pivoting the clutch-block in the bail. The bail is composed of the two forks or members $c\ c$, of which the said eyes $c'$ form a part, and the shank $c^2$ and swiveled ring $c^3$, to which the rope D is attached.

E is a locking pawl or dog arranged to close or partially close the slot A', for retaining the device on the sucker-rod F or tubing when the same is applied thereto, as indicated in Figs. 1, 2, and 4. The said pawl or dog E in this instance is inclosed in a slot $f$, formed in the block A at one side of the slot or recess A' therein, and is pivoted on the pin $f'$ and acted on by the spring $h$, which normally holds the dog with its inner end projecting into the slot or recess A'. The dog may be turned back to release the device from the rod F by pressing back on the thumb-stud $d$, which is attached to the dog and works in the slot $d'$ in the top of the clutch-block. For convenience, the spring $h$, which actuates the dog, presses at its free end on the shank of the said thumb-stud, and to protect the spring it is placed in a recess $h'$, covered by the plate $h^2$. (Shown clearly in Figs. 2, 4, and 6.)

$f^4$ is a thumb-piece at the heel of the pawl E, whereby the latter may be operated when the device is above the operator.

In operation the clutch-block is slipped on the rod to be lifted below one of the coupling joints or unions $m$. The device is then lifted by the rope D lifting the rod. The dog E is then forced back at the top of the derrick and the block withdrawn from the rod and lowered and applied again below the next coupling or union, and the operation is repeated.

Having thus described my invention, I claim as new and desire to secure by Letters Patent—

The block A, pivoted on trunnions in the bail C and formed with the recess $h'$ in its upper surface and slotted at $f$, in combination with the dogs E, pivoted in said slot and formed with the outwardly-projecting thumb-piece, the spring $h$, arranged in said recess and acting upon the dog, and the plate $h^2$, covering the said spring $h$, substantially as described.

CASSIUS M. MAXSON.

Witnesses:
S. S. APPLEBY,
L. J. CLARK.